(12) United States Patent
Mahendran et al.

(10) Patent No.: US 11,989,900 B2
(45) Date of Patent: May 21, 2024

(54) OBJECT RECOGNITION NEURAL NETWORK FOR AMODAL CENTER PREDICTION

(71) Applicant: Magic Leap, Inc., Plantation, FL (US)

(72) Inventors: Siddharth Mahendran, San Jose, CA (US); Nitin Bansal, Sunnyvale, CA (US); Nitesh Sekhar, Mountain View, CA (US); Manushree Gangwar, San Francisco, CA (US); Khushi Gupta, Mountain View, CA (US); Prateek Singhal, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 133 days.

(21) Appl. No.: 17/357,118

(22) Filed: Jun. 24, 2021

(65) Prior Publication Data

US 2021/0407125 A1 Dec. 30, 2021

Related U.S. Application Data

(60) Provisional application No. 63/043,463, filed on Jun. 24, 2020.

(51) Int. Cl.
*G06T 7/73* (2017.01)
*G06F 18/21* (2023.01)
(Continued)

(52) U.S. Cl.
CPC .......... *G06T 7/579* (2017.01); *G06F 18/2163* (2023.01); *G06F 18/24* (2023.01);
(Continued)

(58) Field of Classification Search
CPC .. G06T 7/579; G06T 7/73; G06T 7/60; G06T 19/006; G06T 2207/20084; G06V 20/20;
(Continued)

(56) References Cited

U.S. PATENT DOCUMENTS 10,509,947 B1 * 12/2019 Douillard ............. G06V 10/764
10,824,862 B2 * 11/2020 Qi ........................ G06F 18/2414
(Continued)

OTHER PUBLICATIONS

Singh, Manish, "Modal and Amodal Completion Generate Different Shapes", 2004, Department of Psychology and Center for Cognitive Science, Rutgers University, vol. 14, pp. 454-459.*
(Continued)

*Primary Examiner* — Shefali D Goradia
(74) *Attorney, Agent, or Firm* — Fish & Richardson P.C.

(57) ABSTRACT

Methods, systems, and apparatus, including computer programs encoded on a computer storage medium, for object recognition neural network for amodal center prediction. One of the methods includes receiving an image of an object captured by a camera. The image of the object is processed using an object recognition neural network that is configured to generate an object recognition output. The object recognition output includes data defining a predicted two-dimensional amodal center of the object, wherein the predicted two-dimensional amodal center of the object is a projection of a predicted three-dimensional center of the object under a camera pose of the camera that captured the image.

18 Claims, 6 Drawing Sheets

(51) Int. Cl.
| | |
|---|---|
| *G06F 18/24* | (2023.01) |
| *G06N 3/04* | (2023.01) |
| *G06T 7/579* | (2017.01) |
| *G06T 7/60* | (2017.01) |
| *G06T 19/00* | (2011.01) |
| *G06V 10/44* | (2022.01) |
| *G06V 20/20* | (2022.01) |
| *G06V 20/64* | (2022.01) |

(52) U.S. Cl.
CPC .............. *G06N 3/04* (2013.01); *G06T 7/60* (2013.01); *G06T 7/73* (2017.01); *G06T 19/006* (2013.01); *G06V 10/454* (2022.01); *G06V 20/20* (2022.01); *G06V 20/647* (2022.01); *G06T 2207/20084* (2013.01)

(58) Field of Classification Search
CPC .............. G06V 20/647; G06V 10/454; G06F 18/2163; G06F 18/24; G06N 3/04
See application file for complete search history.

(56) References Cited

U.S. PATENT DOCUMENTS

| | | |
|---|---|---|
| 2019/0147245 A1 | 5/2019 | Qi et al. |
| 2019/0248487 A1 | 8/2019 | Holtz et al. |
| 2020/0193628 A1 | 6/2020 | Chakraborty et al. |

OTHER PUBLICATIONS

Girshick et al., "Rich feature hierarchies for accurate objectdetection and semantic segmentation," Paper, Presented at Proceedings of the IEEE conference on computer vision and pattern recognition, Columbus OH, Jun. 23-28, 2014, 580-587.
Gross et al., "AlignNet-3D: Fast Point Cloud Registration of Partially Observed Objects," Paper, Presented at Proceedings of the IEEE International Conference on 3D Vision (3DV), Quebec City, QC, Canada, Sep. 16-19, 2019, 10 pages.
He et al., "Mask R-CNN," Paper, Presented at Proceedings of the IEEE international conference on computer vision, Venice, Italy, Oct. 22-29, 2017, 2980-2988.
International Search Report and Written Opinion in International Appln. No. PCT/US2021/038971, dated Sep. 29, 2021, 9 pages.
Ren et al., "Faster R-CNN: Towards real-time object detection with region proposal networks," Paper, Presented at Proceedings of the Advances in Neural Information Processing Systems 28, Montreal, Canada, Dec. 7-12, 2015, 9 pages.
Sun et al., "A 3D Convolutional Neural Network Towards Real-time Amodal 3D Object Detection," Paper, Presented at Proceedings of the IEEE/RSJ International Conference on Intelligent Robots and Systems, Madrid, Spain, Oct. 1-5, 2018, 8 pages.
Chen et al., "Amodal detection of 3D objects with separate network output branches," Paper, Presented at Proceedings of the 2019 Chinese Control And Decision Conference (CCDC), Nanchang, China, Jun. 3-5, 2019, pp. 3943-3948.
Extended European Search Report in European Appln. No. 21829170. 6, dated Jul. 6, 2023, 10 pages.
Kundu et al., "3D-RCNN: Instance-Level 3D Object Reconstruction via Render-and-Compare," Paper, Presented at Proceedings of the 2018 IEEE/CVF Conference on Computer Vision and Pattern Recognition, Salt Lake City, UT, Jun. 18-23, 2018, pp. 3559-3568.
Qi et al., "Frustum PointNets for 3D Object Detection from RGB-D Data," Paper, Presented at Proceedings of the 2018 IEEE/CVF Conference on Computer Vision and Pattern Recognition, Salt Lake City, UT, Jun. 18-23, 2018, pp. 918-927.

\* cited by examiner

OBJECT RECOGNITION NEURAL NETWORK FOR AMODAL CENTER PREDICTION

CROSS-REFERENCE TO RELATED APPLICATIONS

This patent application claims priority to and the benefit of U.S. Provisional Patent Application No. 63/043,463, filed on Jun. 24, 2020 and entitled "OBJECT RECOGNITION NEURAL NETWORK FOR AMODAL CENTER PREDICTION," which is hereby incorporated herein by reference in its entirety.

TECHNICAL FIELD

This application relates generally to a cross reality system.

BACKGROUND

Computers may control human user interfaces to create an X Reality (XR or cross reality) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users' sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

To realistically render virtual content, an XR system may build a representation of the physical world around a user of the system. This representation, for example, may be constructed by processing images acquired with sensors on a wearable device that forms a part of the XR system. In such a system, a user might perform an initialization routine by looking around a room or other physical environment in which the user intends to use the XR system until the system acquires sufficient information to construct a representation of that environment. As the system operates and the user moves around the environment or to other environments, the sensors on the wearable devices might acquire additional information to expand or update the representation of the physical world.

The system may recognize objects in the physical world using a two-dimensional (2-D) object recognition system. For example, the system may provide an image acquired with a sensor on the wearable device as an input to a 2-D bounding box generation system. The system may receive a respective 2-D bounding box for each of the objects that have been recognized in the image. The XR system can build a representation of the physical world using the 2-D bounding boxes for the objects that have been recognized. As the user moves around the environment or to other environments, the XR system can expand or update the representation of the physical world using the 2-D bounding boxes for the objects that have been recognized in additional images acquired by the sensors.

BRIEF SUMMARY

Aspects of the present application relate to methods and apparatus for an object recognition neural network that predicts an amodal center of an object in an image captured in an X reality (cross reality or XR) system. Techniques as described herein may be used together, separately, or in any suitable combination.

In general, one innovative aspect of the subject matter described in this specification can be embodied in methods that include the actions of receiving an image of an object captured by a camera; and processing the image of the object using an object recognition neural network that is configured to generate an object recognition output comprising: data defining a predicted two-dimensional amodal center of the object, wherein the predicted two-dimensional amodal center of the object is a projection of a predicted three-dimensional center of the object under a camera pose of the camera that captured the image. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

The foregoing and other embodiments can each optionally include one or more of the following features, alone or in combination. In particular, one embodiment includes all the following features in combination. The object recognition output comprises pixel coordinates of the predicted two-dimensional amodal center. The object recognition neural network comprises a regression output layer that generates the pixel coordinates of the predicted two-dimensional amodal center. The object recognition neural network is a multi-task neural network and the object recognition output also comprises data defining a bounding box for the object in the image. The predicted two-dimensional amodal center is outside of the bounding box in the image. The object recognition output comprises a truncation score that represents a likelihood that the object is truncated in the image. The actions include obtaining data specifying one or more other predicted two-dimensional amodal centers of the object in one or more other images captured under different camera poses; and determining, from (i) the predicted two-dimensional amodal center of the object in the image and (ii)

the one or more other predicted two-dimensional amodal centers of the object, the predicted three-dimensional center of the object.

The subject matter described in this specification can be implemented in particular embodiments so as to realize one or more of the following advantages. The object recognition neural network predicts a two-dimensional (2-D) amodal center of an object in an input image, along with a bounding box of the object and a category of the object. The 2-D amodal center of an object is a projection of a predicted 3-D center of the object under a camera pose of the camera that captured the input image. The 2-D amodal centers can be a very sparse representation of the objects in the input image and can efficiently store information of the number of objects in the scene and their corresponding locations. The 2-D amodal center can be employed by users or application developers as an efficient and effective substitute for other 2-D or 3-D object representations that might be computationally more expensive. For example, a 2-D amodal center can be a substitute for a 3-D object bounding box, a 3-D point cloud representation, or a 3-D mesh representation, etc. The number and locations of the 3-D objects recognized in the scene can be efficiently stored, and can be efficiently accessed and queried by the application developers. In some implementations, multiple 2-D amodal centers of the same object predicted from multiple input images captured under different camera poses can be combined to determine a 3-D center of the object.

The object recognition neural network predicts the amodal center through a keypoint regression approach that can directly generate the pixel coordinates of the 2-D amodal center instead of generating a probability distribution over possible locations of the amodal center, e.g., generating a probability distribution map inside the predicted bounding box. The keypoint regression approach provides more flexibility of the location of the amodal center, i.e., the amodal center can be either inside or outside the bounding box of the object. The object recognition neural network can predict an amodal center of a truncated object or an occluded object in which an amodal center may not lie inside the object bounding box. In some implementations, the object recognition neural network can generate a truncation score that can represent a likelihood that the object is truncated in the image and the truncation score can be a confidence score of the predicted amodal center.

Based on a passable world model generated or updated from the 2-D or 3-D amodal centers of the objects, the XR system can enable multiple applications and can improve immersive experiences in the applications. Users of the XR system or application developers can place XR contents or applications in the physical world with one or more objects that have been recognized in the scene of the environment. The XR system can enable intuitive visualization of the objects in a scene for the users of the XR system. For example, the XR system can enable intuitive visualization of a 3-D object for the end-users with an arrow pointing to the amodal center of the 3-D object, indicating the location of the 3-D object.

The foregoing summary is provided by way of illustration and is not intended to be limiting.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Described herein are methods and apparatus for an object recognition neural network that predicts an amodal center of an object captured in an X reality (cross reality or XR) system. To provide realistic XR experiences to multiple users, an XR system must know the users' physical surroundings in order to correctly correlate locations of virtual objects in relation to real objects. An XR system may build an environment map of a scene, which may be created from image and/or depth information collected with sensors that are part of XR devices worn by users of the XR system. The environment map of a scene can include data specifying the real objects in the scene which can be obtained through the scalable 3-D object recognition.

Figure 1:
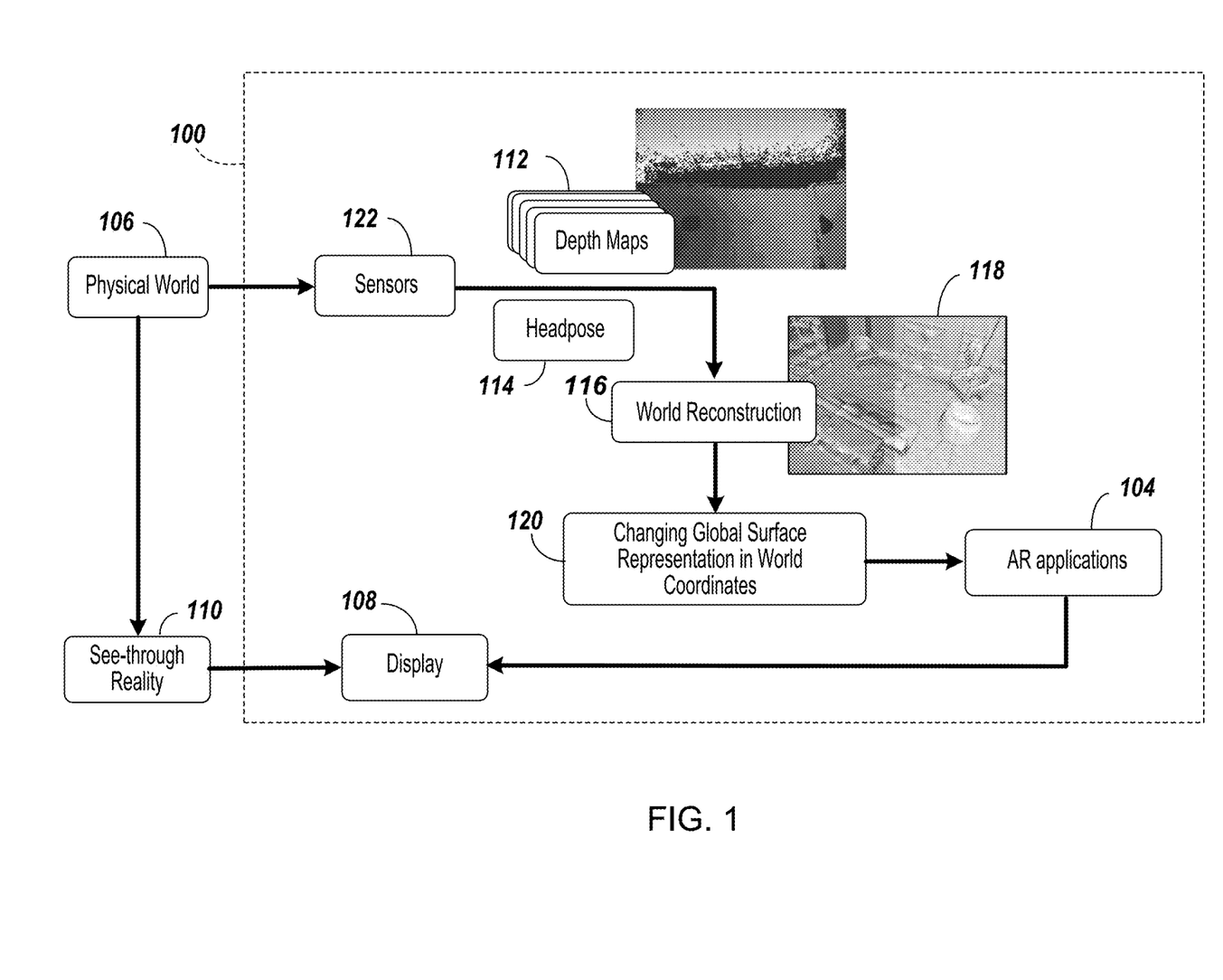
FIG. 1 is a schematic diagram illustrating data flow in an AR system configured to provide an experience to the user of AR content interacting with a physical world.

FIG. 1 depicts an AR system 100 configured to provide an experience of AR contents interacting with a physical world 106, according to some embodiments. The AR system 100 may include a display 108. In the illustrated embodiment, the display 108 may be worn by the user as part of a headset such that a user may wear the display over their eyes like a pair of goggles or glasses. At least a portion of the display may be transparent such that a user may observe a see-through reality 110. The see-through reality 110 may correspond to portions of the physical world 106 that are within a present viewpoint (e.g. field of view) of the AR system 100, which may correspond to the viewpoint of the user in the case that the user is wearing a headset incorporating both the display and sensors of the AR system to acquire information about the physical world.

AR contents may also be presented on the display 108, overlaid on the see-through reality 110. To provide accurate interactions between AR contents and the see-through reality 110 on the display 108, the AR system 100 may include sensors 122 configured to capture information about the physical world 106.

The sensors 122 may include one or more depth sensors that output depth maps 112. In some embodiments, one or more depth sensors may output depth data that may be converted into depth maps by a different system or by one or more different components of the XR system. Each depth map 112 may have multiple pixels, each of which may represent a distance to a surface in the physical world 106 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire monocular or stereoscopic information that may be processed to represent the physical world in other ways. For example, the images may be processed in world reconstruction component 116 to create a mesh, representing all or portions of objects in the physical world. Metadata about such objects, including for example, color and surface texture, may similarly be acquired with the sensors and stored as part of the world reconstruction.

The system may also acquire information about the head pose (or "pose") of the user with respect to the physical world. In some embodiments, a head pose tracking component of the system may be used to compute head poses in real time. The head pose tracking component may represent a head pose of a user in a coordinate frame with six degrees of freedom including, for example, translation in three perpendicular axes (e.g., forward/backward, up/down, left/right) and rotation about the three perpendicular axes (e.g., pitch, yaw, and roll). In some embodiments, sensors 122 may include inertial measurement units that may be used to compute and/or determine a head pose 114. A head pose 114 for a camera image may indicate a present viewpoint of a sensor capturing the camera image with six degrees of freedom, for example, but the head pose 114 may be used for other purposes, such as to relate image information to a particular portion of the physical world or to relate the position of the display worn on the user's head to the physical world.

In some embodiments, the AR device may construct a map from the feature points recognized in successive images in a series of image frames captured as a user moves throughout the physical world with the AR device. Though each image frame may be taken from a different pose as the user moves, the system may adjust the orientation of the features of each successive image frame to match the orientation of the initial image frame by matching features of the successive image frames to previously captured image frames. Translations of the successive image frames so that points representing the same features will match corresponding feature points from previously collected image frames, can be used to align each successive image frame to match the orientation of previously processed image frames. The frames in the resulting map may have a common orientation established when the first image frame was added to the map. This map, with sets of feature points in a common frame of reference, may be used to determine the user's pose within the physical world by matching features from current image frames to the map. In some embodiments, this map may be called a tracking map.

In addition to enabling tracking of the user's pose within the environment, this map may enable other components of the system, such as world reconstruction component 116, to determine the location of physical objects with respect to the user. The world reconstruction component 116 may receive the depth maps 112 and head poses 114, and any other data from the sensors, and integrate that data into a reconstruction 118. The reconstruction 118 may be more complete and less noisy than the sensor data. The world reconstruction component 116 may update the reconstruction 118 using spatial and temporal averaging of the sensor data from multiple viewpoints over time.

The reconstruction 118 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 118, portions of the physical world are presented as a global surface; on the right side of the reconstruction 118, portions of the physical world are presented as meshes.

In some embodiments, the map maintained by head pose component 114 may be sparse relative to other maps that might be maintained of the physical world. Rather than providing information about locations, and possibly other characteristics, of surfaces, the sparse map may indicate locations of interest points and/or structures, such as corners or edges. In some embodiments, the map may include image frames as captured by the sensors 122. These frames may be reduced to features, which may represent the interest points and/or structures. In conjunction with each frame, information about a pose of a user from which the frame was acquired may also be stored as part of the map. In some embodiments, every image acquired by the sensor may or may not be stored. In some embodiments, the system may process images as they are collected by sensors and select subsets of the image frames for further computation. The selection may be based on one or more criteria that limits the addition of information yet ensures that the map contains useful information. The system may add a new image frame to the map, for example, based on overlap with a prior image frame already added to the map or based on the image frame containing a sufficient number of features determined as likely to represent stationary objects. In some embodiments, the selected image frames, or groups of features from selected image frames may serve as key frames for the map, which are used to provide spatial information.

The AR system 100 may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction of the physical world, which may serve as an abstract layer for the map and provide spatial information. The reconstruction may be more complete and less noisy than the original sensor data by using spatial and temporal averaging (i.e. averaging data from multiple viewpoints over time), or any other suitable method.

In the illustrated embodiment in FIG. 1, a map (e.g. a tracking map) represents the portion of the physical world in which a user of a single, wearable device is present. In that scenario, head pose associated with frames in the map may be represented as a local head pose, indicating orientation relative to an initial orientation for a single device at the start of a session. For example, the head pose may be tracked relative to an initial head pose when the device was turned on or otherwise operated to scan an environment to build a representation of that environment.

In combination with content characterizing that portion of the physical world, the map may include metadata. The metadata, for example, may indicate time of capture of the sensor information used to form the map. Metadata alternatively or additionally may indicate location of the sensors at the time of capture of information used to form the map. Location may be expressed directly, such as with information from a GPS chip, or indirectly, such as with a Wi-Fi signature indicating strength of signals received from one or more wireless access points while the sensor data was being collected and/or with the BSSIDs of wireless access points to which the user device connected while the sensor data was collected.

The reconstruction 118 may be used for AR functions, such as producing a surface representation of the physical world for occlusion processing or physics-based processing. This surface representation may change as the user moves or objects in the physical world change. Aspects of the reconstruction 118 may be used, for example, by a component 120 that produces a changing global surface representation in world coordinates, which may be used by other components.

The AR content may be generated based on this information, such as by AR applications 104. An AR application 104 may be a game program, for example, that performs one or more functions based on information about the physical world, such as visual occlusion, physics-based interactions, and environment reasoning. It may perform these functions by querying data in different formats from the reconstruction 118 produced by the world reconstruction component 116. In some embodiments, component 120 may be configured to output updates when a representation in a region of interest of the physical world changes. That region of interest, for example, may be set to approximate to a portion of the physical world in the vicinity of the user of the system, such as the portion within the view field of the user, or is projected (predicted/determined) to come within the view field of the user.

The AR applications 104 may use this information to generate and update the AR contents. The virtual portion of the AR contents may be presented on the display 108 in combination with the see-through reality 110, creating a realistic user experience.

Figure 2:
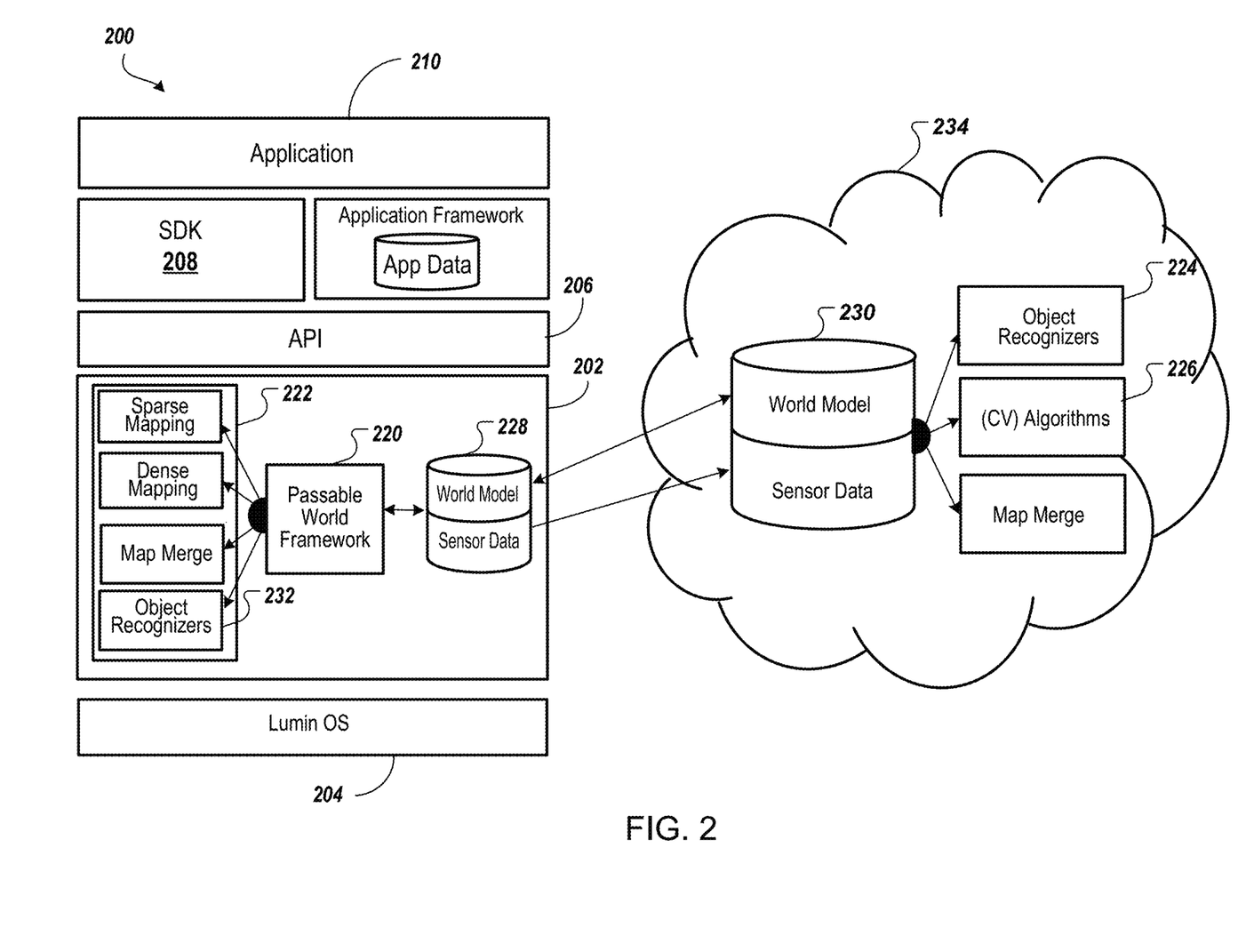
FIG. 2 is a schematic diagram illustrating components of an AR system that maintain a model of a passable world.

FIG. 2 is a schematic diagram illustrating components of an AR system 200 that maintain a passable world model. The passable world model is a digital representation of the real objects in the physical world. The passable world model can be stored and updated with changes to the real objects in the physical world. The passable world model can be stored in storage systems in combination with images, features, directional audio inputs, or other desired data. The passable world model can be used to generate the reconstruction 118 by the world reconstruction component 116 in FIG. 1.

In some implementations, a passable world model may be represented in a way that may be readily shared among users and among the distributed components, including applications. Information about the physical world, for example, may be represented as persistent coordinate frames (PCFs). A PCF may be defined based on one or more points that represent features recognized in the physical world. The features may be selected such that they are likely to be the same from user session to user session of the XR system. PCFs may be defined sparsely based on one or more points in the space (e.g., corners, edges), providing less than all of the available information about the physical world, such that they may be efficiently processed and transferred. A PCF may comprise six degrees of freedom with translations and rotations relative to a map coordinate system.

The AR system 200 may include a passable world component 202, an operating system (OS) 204, API's 206, SDK 208, and Application 210. The OS 204 may include a Linux-based kernel with custom drivers compatible with an AR device, e.g., a Lumin OS. The API's 206 may include application programming interfaces that grant AR applications (e.g., Applications 210) access to the spatial computing features of an AR device. The SDK 208 may include a software development kit that allows the creation of AR applications.

The passable world component 202 can create and maintain a passable world model. In this example sensor data is collected on a local device. Processing of that sensor data may be performed in part locally on the XR device and partially in the cloud. In some embodiments, processing of that sensor data may be performed only on the XR device, or only in the cloud. The passable world model may include environment maps created based, at least in part, on data captured by AR devices worn by multiple users.

The passable world component 202 includes a passable world framework (FW) 220, storage system 228, and a plurality of spatial computation components 222.

The passable world framework 220 can include computer-implemented algorithms programmed to create and maintain the model of the passable world. The passable world framework 220 stores the passable world model in a storage system 228. For example, the passable world framework can store a current passable world model and sensor data in the storage system 228. The passable world framework 220 creates and updates the passable world model by calling the spatial computation components 222. For example, the passable world framework can obtain bounding boxes of the objects in a scene by triggering the object recognizers 232 to perform object recognition.

The spatial computation components 222 include a plurality of components that can perform computation in the 3-D space of a scene. For example, the spatial computation components 222 can include an object recognition system (also called "object recognizers") 232, sparse mapping system, dense mapping system and map merge systems, etc. The spatial computation components 222 can generate outputs that can be used to create or update the passable world model. For example, the object recognition system can generate output data that specifies one or more bounding boxes of one or more objects that have been recognized in a stream of images captured by sensors of an AR device.

The storage system 228 can store the passable world model and sensor data acquired from multiple AR devices in one or more databases. The storage system can provide sensor data and an existing passable world model, e.g., objects that have been recognized in the scene, to the algorithms in the passable world FW 220. After computing an updated passable world model based on newly acquired sensor data, the storage system 228 can receive the updated passable world model from the passable world FW 220 and store the updated passable world model in the databases.

In some implementations, part or all components of the passable world component 202 can be implemented in a plurality of computers or computer systems in a cloud computing environment 234. The cloud computing environment 234 has distributed scalable computation resources that can be physically located at a location different from the location of the AR system 200. The plurality of computers or computer systems in the cloud computing environment 234 can provide a flexible amount of storage and computation capabilities. Using the cloud computing environment, the AR system 200 can provide scalable AR Applications 210 that involves multiple user devices, and/or an environment that includes a large amount of physical objects.

In some implementations, a cloud storage system 230 can store the world model and the sensor data. The cloud storage system 230 can have scalable storage capacity and can adapt to various amounts of storage needs. For example, the cloud storage system 230 can receive recently captured sensor data from a local storage system 228. As more and more sensor data is captured by sensors of an AR device, the cloud storage system 230 that has large storage capacity can accommodate the recently captured sensor data. The cloud storage system 230 and the local storage system 228 can store the same world model. In some implementations, a complete world model of an environment can be stored on the cloud storage system 230, while a part of the passable world model that is pertinent to the current AR Application 210 can be stored on the local storage system 228.

In some implementations, some of the spatial computation components 222 can be executed in the cloud computing environment 234. For example, object recognizers 224, computer vision algorithms 226, map merge and many other kinds of spatial computation components can be implemented and executed in the cloud. The cloud computing environment 234 can provide more scalable and more powerful computers and computer systems to support the computation needs of these spatial computation components. For example, an object recognizer may include a deep convolutional neural network (DNN) model that requires heavy computation using graphical computation units (GPUs) or other hardware accelerators and a large amount of runtime memory to store the DNN model. The cloud computing environment can support this kind of requirement of the object recognizer.

In some implementations, the spatial computation components, e.g., object recognizers, can perform computation in the cloud while using the sensor data and existing world model that are stored in the cloud storage system 230. In some implementations, the spatial computation and the cloud storage can exist in the same cloud computer system in order to enable efficient computation in the cloud. The cloud computation results, e.g., object recognition results, can be further processed and then stored as an updated passable world model in the cloud storage system 230.

The object recognition system (also called "object recognizers") 224 can generate 3-D object recognition outputs for multiple 3-D objects in a scene of the environment using an object recognition algorithm. In some implementations, the object recognition system 224 can generate a 2-D object recognition output from input sensor data using a 2-D object recognition algorithm. Then the object recognition system 224 can generate a 3-D object recognition output based on the 2-D object recognition output.

The 2-D object recognition output generated by the object recognition system 224 can include a 2-D amodal center. Optionally, the 2-D object recognition output can further include one or more of the following: an object category, a 2-D bounding box, a 2-D instance mask, etc. The object category of a recognized object in an input image can include a respective probability for each of a plurality of object classes that represents a likelihood that the recognized object belongs to the object class. The 2-D bounding box of the object is an estimated rectangular box that tightly surrounds the object recognized in the input image. The 2-D instance mask can locate each pixel of the object recognized in the input image and can treat multiple objects of the same class as distinct individual objects, e.g., instances.

The 2-D amodal center of an object is defined as a projection of a predicted 3-D center of the object under a camera pose of the camera that captured the input image. The 2-D amodal center can include pixel coordinates of the predicted 2-D amodal center. The 2-D amodal centers can be a very sparse representation of the objects in the input image and can efficiently store information of the number of objects in the scene and their corresponding locations. The 2-D amodal center can be employed by users or application developers as an efficient and effective substitute for other 2-D or 3-D object representations that might be computationally more expensive. For example, a 2-D amodal center can be a substitute for a 3-D object bounding box, a 3-D point cloud representation, or a 3-D mesh representation, etc. In some implementations, multiple 2-D amodal centers of the same object predicted from multiple input images captured under different camera poses can be combined to determine a 3-D center of the object.

The object recognition system 224 can generate 2-D object recognition outputs, including the 2-D amodal centers, from input sensor data using an object recognition neural network. The object recognition neural network can be trained to generate 2-D object recognition outputs from input sensor data. The cloud computing environment 234 can provide one or more computing devices having software or hardware modules that implement the respective operations of each layer of the 2-D object recognition neural network according to an architecture of the neural network. More details of an object recognition neural network that predicts amodal centers of one or more objects captured in the input image are described in connection with FIGS. 3-5. More details of training an object recognition neural network are described in connection with FIG. 6.

Figure 3:
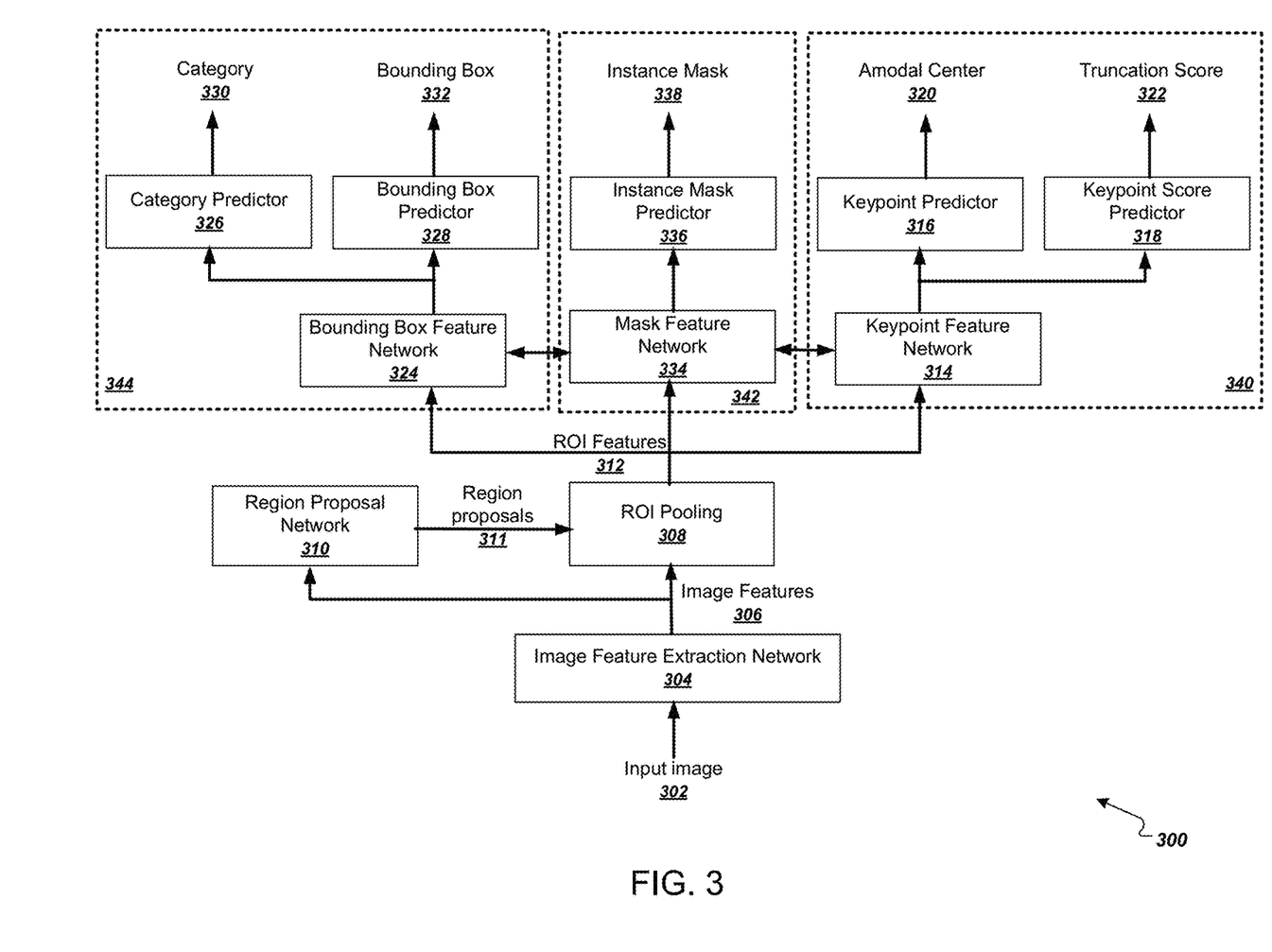
FIG. 3 illustrates an example architecture of an object recognition neural network for making 2-D amodal center predictions from an image.

FIG. 3 illustrates an example architecture of an object recognition neural network 300 for making 2-D amodal center predictions from an input image 302. The network 300 can predict a 2-D amodal center 320 of an object along with predicting an object bounding box 332 and an object category 330, etc.

The input image 302 can be a 2-D color image captured by a camera. The 2-D color input image can be an RGB image depicting colors of one or more objects and colors of their surrounding environment in the physical world. The color image can be associated with camera pose data that specifies a pose of the camera that captured the image when the color image was captured. The camera pose data can define the pose of the camera along six degrees of freedom (6DOF), e.g., forward and backward, up and down, left and right relative to a coordinate system of the surrounding environment.

In some implementations, the input image 302 can be a 2-D image in a stream of input images that captures a scene of an environment. The stream of input images of the scene can be captured using one or more cameras of one or more AR devices. In some implementations, multiple cameras (e.g. RGB cameras) from multiple AR devices can generate images of the scene from various camera poses. As each camera moves in the environment, each camera can capture information of an object in the environment at a series of camera poses.

The object recognition neural network 300 is a convolutional neural network (CNN) that regresses a predicted value for the 2-D amodal center. The object recognition neural network 300 can predict the 2-D amodal center through a keypoint regression approach that can directly generate the pixel coordinates of the 2-D amodal center instead of generating a probability distribution over possible locations of the 2-D amodal center, e.g., generating a probability distribution map inside the predicted bounding box. Therefore, the keypoint regression approach can provide more flexibility of the location of the 2-D amodal center. The 2-D amodal center can be either inside or outside the bounding box of the object.

In some implementations, the network 300 implements an object recognition algorithm that can formulate the 2-D amodal center prediction task as a keypoint regression task in a Region Convolutional Neural Network (RCNN) (i.e., a type of CNN) framework (Girshick R, Donahue J, Darrell T, Malik J, "Rich feature hierarchies for accurate object detection and semantic segmentation." Proceedings of the IEEE conference on computer vision and pattern recognition.

2014). The RCNN framework is a family of algorithms to solve 2-D object recognition problems. The RCNN framework can perform object recognition tasks based on regional-of-interest (ROI) features that are computed from region proposals, e.g., proposals of candidate regions that include objects of interest. The object recognition tasks can include an object detection or localization task that generates object bounding boxes, an object classification task that generates object category labels, an object segmentation task that generates object segmentation masks, and a keypoint regression task that generates keypoints on an object, etc. Examples of object recognition neural networks with the RCNN framework include the Faster RCNN algorithm (Ren, Shaoqing, et al. "Faster R-CNN: Towards real-time object detection with region proposal networks." Advances in neural information processing systems. 2015), the Mask RCNN algorithm (He, Kaiming, et al. "Mask R-CNN." Proceedings of the IEEE international conference on computer vision. 2017), and many other RCNN based algorithms, etc.

A neural network in the RCNN family can include an image feature extraction network 304, a region proposal network 310, an ROI pooling network 308 and a prediction network. The prediction network can generate final object recognition outputs from ROI features 312. A multi-task RCNN can include a plurality of prediction networks, each of which can perform a different object recognition task. Examples of prediction networks include a keypoint prediction network 340, an object detection network 344, and an instance segmentation network 342, etc.

The network 300 includes an image feature extraction network 304 that takes input image 302 as input and generates image features 306. Generally, in machine learning and pattern recognition, feature extraction starts from an initial set of measured data and builds derived values, i.e., a set of features, intended to be informative about properties of the input sensor data and non-redundant. The image feature extraction network 304 is a convolutional neural network that includes a number of convolutional layers and optionally, a number of deconvolutional layers. Each convolutional layer and deconvolutional layer has parameters whose values define the filters for the layer.

The network 300 includes a Region Proposal Network (RPN) 310 (Ren, Shaoqing, et al. "Faster R-CNN: Towards real-time object detection with region proposal networks." Advances in neural information processing systems. 2015). The RPN can take image features 306 as input and can generate region proposals 311. Each region proposal can include a predicted object bounding box and a confidence score indicating a likelihood that the predicted object bounding box includes an object that belongs to predetermined object categories. For example, the RPN can take anchors as input, which are fixed-size rectangles defined over the image features 306, and can predict a likelihood that each anchor contains an object and can predict a coordinate offset relative to each anchor that represents the location information of the object detected in each anchor. The RPN 310 can be implemented as one or more convolutional layers and/or fully connected layers.

The network 300 includes a Region-of-interest (ROI) pooling network 308. The ROI pooling network can take (1) image features 306 and (2) region proposals 311 as input, and can generate ROI features 312 for each region proposal 311. For each region proposal, the ROI pooling network can take a portion of the image features 306 which correspond to the region proposal, and can convert the portion of the image features to a fixed dimension feature map, i.e., the ROI features 312. For example, for each region proposal, the input features to the ROI pooling network can be non-uniform because the region proposal can have different sizes. The ROI pooling network can produce fixed-size ROI features, e.g., with dimension 7×7×1024, by performing a pooling operation (e.g., max pooling, average pooling, etc.) on the non-uniform input features. The fixed-size ROI features 312 are ready for use in subsequent prediction networks, e.g., a keypoint prediction network 340.

The network 300 can include a plurality of prediction networks that can perform object recognition tasks. The network 300 can include a keypoint prediction network 340, an object detection network 344, and an instance segmentation network 342.

The keypoint prediction network 340 can generate locations of 2-D amodal centers 320 of one or more objects in the input image 302 from the ROI features 312. In general, the keypoint prediction network can generate a plurality of keypoints of an object in an image. Keypoints are spatial locations, e.g., pixel coordinates, in the image that define locations of interesting features, or features that stand out in the image. In some implementations, by using a keypoint prediction network 340 and formulating the amodal center prediction task as a keypoint regression task, the network 300 can predict an amodal center 320 along with an object bounding box 332, an object category label 330, and an object instance mask 338.

The 2-D amodal center of an object is defined as a projection of a 3-D object center under the camera pose of the input image. Here, the 3-D object center is the geometric center of a tight, gravity oriented cuboid surrounding the object in 3-D. The 2-D amodal center is a keypoint in the input image and can be a sparse representation of the 3-D object.

Figure 4:
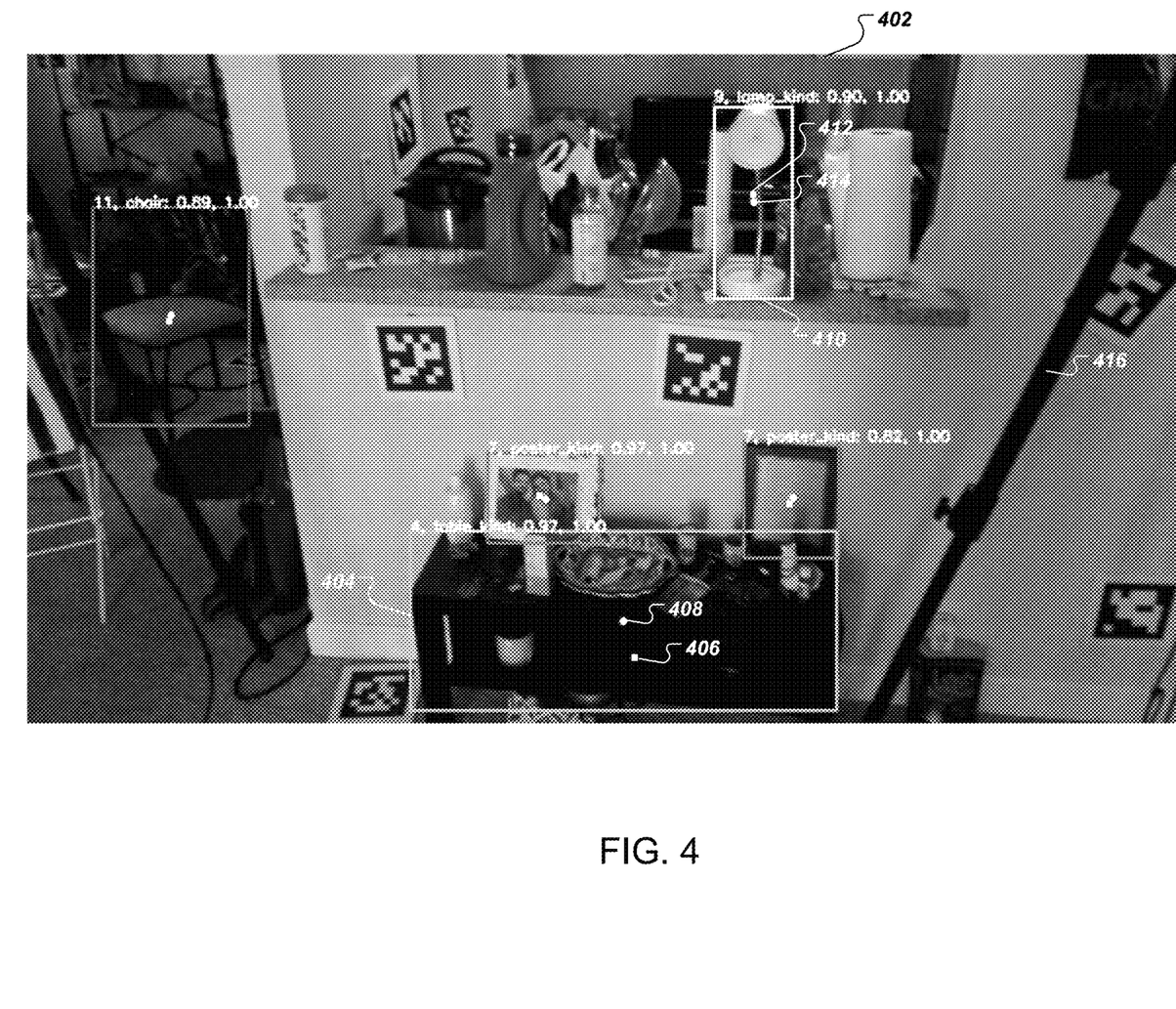
FIG. 4 illustrates an example of predicting 2-D amodal centers of objects in an image.

Referring to FIG. 4, for example, a table with a predicted bounding box 404 is viewed from the top in an image 402. The center of the predicted 2-D bounding box 404 is at a location 408, and the amodal center of the table is at a location 406. Because the table is currently viewed from the top, the location of the amodal center 406 is lower than the center 408 of the 2-D bounding box. This indicates that the center of the 3-D bounding box of the table is lower than the center of the 2-D bounding box predicted in the image 402 under its camera pose.

Referring back to FIG. 3, the keypoint prediction network 340 includes a keypoint feature network 314. For each ROI, the keypoint feature network 314 can take the ROI features 312 of the ROI as an input and can generate keypoint features of an object in the ROI. The keypoint features are feature vectors that contain information of the 2-D amodal center of the object in the ROI. For example, the generate keypoint features can be a 1-D vector of length 1024. The keypoint feature network 314 can be implemented as one or more convolutional layers and/or fully connected layers.

In some implementations, in addition to the ROI features 312, one or more features generated by a bounding box feature network 324, or mask feature network 334 can be used as input to the keypoint feature network 314 to generate keypoint features of the ROI. In some implementations, the keypoint features generated by the keypoint feature network 314 can be used in an object detection network 344, or an instance segmentation network 342 as well.

The keypoint prediction network 340 includes a keypoint predictor 316. For each ROI, the keypoint predictor 316 takes as input the keypoint features generated by the keypoint feature network 314 and generates a 2-D amodal center 320 of the object in the ROI. In some implementations, the keypoint predictor 316 can generate pixel coordinates of the predicted 2-D amodal center. The keypoint predictor 316 can be implemented in one or more regression layers that can output real or continuous values, e.g., the pixel coordinates of the predicted 2-D amodal center 320 in the image 302.

In some implementations, the 2-D amodal center 320 can be represented using the amodal center's location relative to the center of the predicted 2-D bounding box. For example, the 2-D amodal center 320 can be represented relative to the center of the predicted 2-D bounding box 332 in the final output, or relative to the center of the bounding box in region proposal 311. Let the coordinates of the upper left corner and the lower right corner of the predicted 2-D bounding box be $(x_0, y_0)$ and $(x_1, y_1)$. The center of the 2-D bounding box is $$(c_X, c_y) = \left(\frac{x_0 + x_1}{2}, \frac{y_0 + y_1}{2}\right).$$

The length and width of the bounding box is $(l,w)=(x_1-x_0, y_1-y_0)$. The 2-D amodal center can be formulated as $$(x,y)=(c_x+\alpha l, c_y+\beta w). \quad (1)$$

The keypoint predictor 316 can include one or more regression layers to predict the parameters $\alpha$ and $\beta$ that defines the location of the 2-D amodal center. The predicted 2-D amodal center can be calculated using equation (1) based on the predicted parameters $\alpha$ and $\beta$.

By formulating the 2-D amodal center prediction task as a keypoint regression task, the keypoint predictor 316 does not limit the 2-D amodal center to be inside the predicted 2-D bounding box. When the predicted 2-D amodal center is inside the predicted 2-D bounding box, the following condition is true:

$$\alpha \in \left[-\frac{1}{2}, +\frac{1}{2}\right] \text{ and } \beta \in \left[-\frac{1}{2}, +\frac{1}{2}\right].$$

When the predicted 2-D amodal center is outside the predicted 2-D bounding box, the values of $\alpha$ or $\beta$ can be outside the interval $$\left[-\frac{1}{2}, +\frac{1}{2}\right].$$

The network 300 can predict the 2-D amodal center with partial visual information about an object in the input image, e.g., a truncated object or an occluded object. A truncated object is partially captured in the image, with part of the object being outside the image. An occluded object is partially hidden or occluded by another object captured in the image. The network 300 can predict the 2-D amodal center even for truncated or occluded objects for which the 2-D amodal center might not be inside the 2-D object bounding box.

For example, when an AR device moves in a room that includes a dining table surrounded by a plurality of chairs, an input image from the stream of camera images may only show the table top of the dining table because the legs of the dining table are occluded by the chairs. Therefore, a predicted 2-D bounding box of the dining table may not include the entire dining table. The neural network 300 can still predict the 2-D amodal center of the dining table which may be outside the predicted 2-D bounding box of the dining table.

In some implementations, the keypoint prediction network 340 can include a keypoint score predictor 318 that can generate a truncation score 322 from the keypoint features generated from the keypoint feature network 314. The truncation score 322 indicates a likelihood that the object is truncated or occluded in the input image 302. The keypoint predictor can be implemented in one or more fully connected layers or one or more regression layers.

Truncated or occluded objects typically have larger object recognition error due to lack of object information. The truncation score 322 can be used to alleviate noisy or inaccurate results when computing a 3-D object recognition output from a 2-D object recognition output generated from an input image capturing a truncated or occluded object. For example, a truncated object in which a large portion of the object is truncated can have a predicted truncation score that is high, indicating a high likelihood that the object is truncated and a low confidence in object recognition predictions. Based on the truncation score, when computing a 3-D center of the object from a predicated 2-D amodal center generated in the input image, the predicted 2-D amodal center can either be discarded, or given a lower weight.

In some implementations, the network 300 can be a multi-task neural network, e.g., a multi-task RCNN that can generate other object recognition outputs along with predicting the 2-D amodal center. The object recognition outputs can include data defining an object category 330, an object bounding box 332, or an object instance mask 338, etc.

In some implementations, the network 300 can include an object detection network 344. The object detection network 344 can generate an object detection output that includes data defining a 2-D bounding box 332 for an object in the input image 302, and an object category 330 of the object in the input image. The object detection network 344 can include a bounding box feature network 324 that can generate bounding box features from the ROI features 312. For each object recognized in the input image, a bounding box predictor 328 can take the bounding box features generated from the bounding box feature network 324 as input and can predict a 2-D bounding box 332 of the object. For each object recognized in the input image, a category predictor 326 can take the bounding box features as input and can generate an object category 330, i.e., an object class label for the object among a plurality of pre-specified object categories of interest. The object detection network 344 can be implemented as one or more convolutional layers and fully connected layers.

In some implementations, the network 300 can include an instance segmentation network 342. The instance segmentation network 342 can generate a 2-D object instance mask 338 that includes data defining pixels that are inside the object. The instance segmentation network can include a mask feature network 334 that can generate mask features from the ROI features 312. For each object recognized in the input image, an instance mask predictor 336 can take the mask features generated from the mask feature network 334 as input and can generate a 2-D instance mask 338 of the object. The instance segmentation network 342 can be implemented as one or more convolutional layers.

FIG. 4 illustrates an example of predicting 2-D amodal centers of objects in an image using the object recognition neural network 300. The image 402 can be a camera image in a stream of input images that captures a scene of an environment. The stream of input images of the scene can be captured using one or more cameras of one or more AR devices. The image 402 captures an indoor environment that includes a plurality of objects, such as a table, a chair, a lamp, photo frames, etc.

The object recognition neural network 300 can process the image 402 and can generate an object recognition output that is illustrated on image 402. The object recognition output can include data defining predicted 2-D amodal centers of one or more objects recognized in the image, such as the table, the lamp, the chair, the photo frames, etc.

For example, the object recognition output includes a predicted 2-D amodal center 406 of a table and a predicted 2-D bounding box 404 of the table. The predicted 2-D amodal center of the table is a projection of a predicted 3-D center of the table under the camera pose. Based on the camera pose of the camera that captured the image 402 (e.g., a top down view of the table), the 2-D amodal center 406 of the table is predicted to be below the center 408 of the predicted 2-D bounding box 404 of the table. The predicted 2-D amodal center can be the pixel coordinates of the pixel 406 in the image 402.

As another example, the object recognition output also includes a predicted 2-D amodal center 412 and a predicted 2-D bounding box 410 of a lamp. The predicted 2-D amodal center of the lamp is a projection of a predicted 3-D center of the lamp under the camera pose. Based on the camera pose of the image 402 (e.g., a leveled view of the lamp), the 2-D amodal center 412 of the lamp is predicted to be almost at the same location as the center 414 of the predicted 2-D bounding box 410 of the lamp.

Besides 2-D amodal centers, the object recognition output can also include a truncation score that represents a likelihood that the object is truncated or occluded in the image. For example, the image 402 only captures a middle portion of the lamp 416, and the top and the bottom portions of the lamp 416 are truncated. The object recognition output can include a truncation score with higher value (e.g., 0.99), which indicates that the likelihood that the lamp 416 is truncated in the image is very high.

Figure 5:
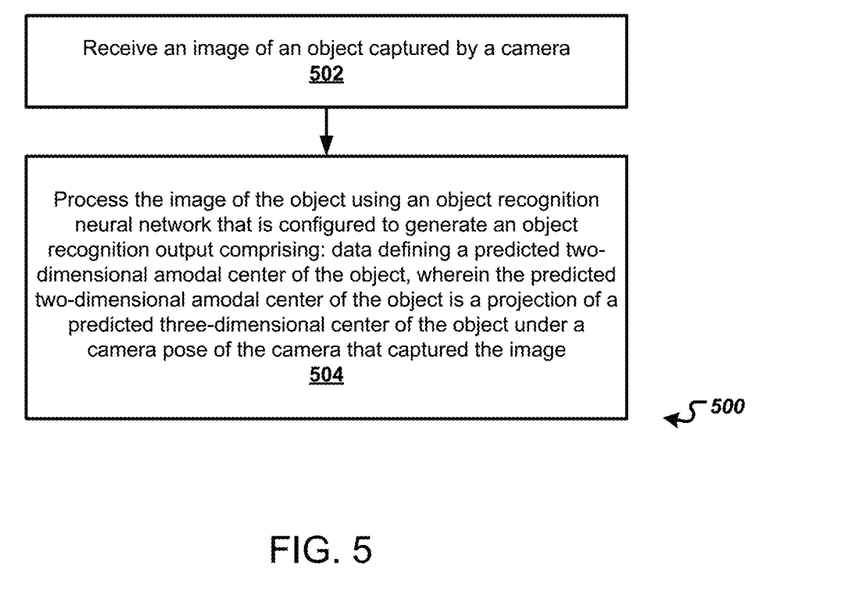
FIG. 5 is a flow chart of an example process for computing 2-D amodal center predictions from an image.

FIG. 5 is a flow chart of an example process 500 for computing 2-D amodal center predictions from an image. The process will be described as being performed by an appropriately programmed AR system 200. The process 500 can be performed in a cloud computing environment 234. In some implementations, some computation in the process 500 can be done in the local AR device in the passable world component 202, while the local AR device is connected to the cloud.

The system receives an image of an object captured by a camera (502). The image can be a single 2-D image of an environment (e.g., a room or a floor of a building) that the AR device is in. The image can be an RGB image, or a grayscale image.

The system processes the image of the object using an object recognition neural network that is configured to generate an object recognition output (504). The object recognition output includes data defining a predicted 2-D amodal center of the object. The predicted 2-D amodal center of the object is a projection of a predicted 3-D center of the object under a camera pose of the camera that captured the image. Here, the 3-D center of the object is the geometric center of a tight, gravity oriented cuboid around the object in 3D.

In some implementations, the object recognition output can include pixel coordinates of the predicted 2-D amodal center. The object recognition neural network can formulate the 2-D amodal center prediction task as a keypoint regression task relative to a 2-D bounding box or an object proposal through a RCNN framework. The object recognition neural network can include a regression output layer that generates the pixel coordinates of the predicted 2-D amodal center.

In some implementations, the predicted 2-D amodal center can be outside of the bounding box in the image. Unlike a keypoint classification approach that generates a probability distribution map inside a predicted object bounding box, the system can predict the 2-D amodal center through a keypoint regression approach that can directly generate the pixel coordinates of the 2-D amodal center. The keypoint regression approach provides more flexibility of the location of the amodal center, i.e., the amodal center can be either inside or outside the bounding box of the object. Because of the flexibility of the location of the amodal center, the system can generate a 2-D amodal center for a truncated object or an occluded object for which the amodal center might not lie inside the object bounding box.

In some implementations, the object recognition neural network can be a multi-task neural network. The object recognition output can further include data defining the bounding box for the object in the image. For example, the object recognition output can include a 2-D bounding box of the object which can be a tight fitting rectangle around the visible portion of the object in an RGB image. In some implementations, the object recognition output can further include an object category label of the object, e.g., one category among a plurality of pre-specified object categories of interest. In some implementations, the object recognition output can further include data defining a segmentation mask for the object in the image.

In some implementations, the system can obtain data specifying one or more other predicted 2-D amodal centers of the object in one or more other images captured under different camera poses. The system can determine, from (i) the predicted 2-D amodal center of the object in the image and (ii) the one or more other predicted 2-D amodal centers of the same object, the predicted 3-D center of the object.

For example, the system can obtain a stream of input images that includes a stream of color images. The stream of input images can be from one or more AR devices that capture the scene from one or more camera poses. In some implementations, an AR device can capture a stream of input images while a user of the AR device travels in the scene. The steam of input images can include corresponding camera pose information.

The system can provide input images that capture various views of the same object to the object recognition neural network 300. The object recognition neural network 300 can generate 2-D amodal centers of the same object from various views. For example, the object recognition neural network 300 can generate 2-D amodal centers for a table from a left side view, a right side view and a front view of the same table.

Based on the 2-D amodal centers of the same object from different views, the system can generate the 3-D center of the object using triangulation algorithms. Triangulation refers to the process of determining a point in a 3-D space given its projections onto two or more 2-D images based on two or more camera poses corresponding to the 2-D images. In some implementations, the system can use depth information captured in an RGBD camera to calculate a corresponding 3-D center for each predicted 2-D amodal center. The system can calculate a 3-D world coordinate for each predicted 2-D amodal center. The system can generate a final 3-D center by averaging the calculated 3-D centers from each camera pose.

In some implementations, the object recognition output can include a truncation score that represents a likelihood that the object is truncated in the image. The truncation score can represent a likelihood that the object is truncated in the image. Truncated objects typically have larger object recognition error due to lack of object information. The predicted truncation score can be used as a confidence score for the predicted 2-D amodal center.

In some implementations, the object may be truncated in one or more images captured under different camera poses. When calculating the 3-D center of a truncated object in a 3-D center triangulation process, the result can be very noisy. The system can use the truncation score of the object when determining the 3-D center of the object from multiple 2-D amodal centers of the object.

For example, the system can discard a predicted 2-D amodal center that corresponds to a truncation score that is above a predetermined threshold value, e.g., 0.9, which indicates that the object in that view is heavily truncated. As another example, the system can apply a weighted averaging algorithm to compute the 3-D center from the 2-D amodal centers, and the system can calculate a weight for each 2-D amodal center based on the corresponding truncation score. For example, the weight can be inversely proportional to the truncation score. When the truncation score is higher, the weight of the corresponding 2-D amodal center can be lower.

Being a very sparse representation, the 2-D or 3-D amodal centers can be used to efficiently store information about the number of objects and the location of the objects in the scene. The amodal centers can be employed by users or application developers as efficient and effective substitutes for other 2-D or 3-D object representations, e.g., 2-D or 3-D object bounding boxes, point clouds, meshes, etc.

The system can store one or more 2-D or 3-D amodal centers of one or more recognized objects in the storage system 230 in the cloud. The system can also store a copy of the amodal centers in the storage system 228 on the AR device. The system can provide the amodal centers to the passable world component 202 of the AR system.

The passable world component 202 can use the one or more 2-D or 3-D amodal centers of the one or more recognized objects to create or to update a passable world model that is shared across multiple AR devices. For example, the one or more amodal centers can be used to create or update persistent coordinate frames (PCFs) in the passable world model. In some implementations, the passable world component can further process the one or more amodal centers in order to generate a new or an updated passable world model.

Based on a passable world model generated or updated from one or more 2-D amodal centers of an object, the AR system can enable multiple applications and can improve immersive experiences in the applications. Users of the AR system or application developers can place AR contents or applications in the physical world with one or more objects that have been recognized in the scene of the environment. For example, a game application can set a virtual logo at or near the 2-D amodal center of an object that has been recognized in the passable world model.

Figure 6:
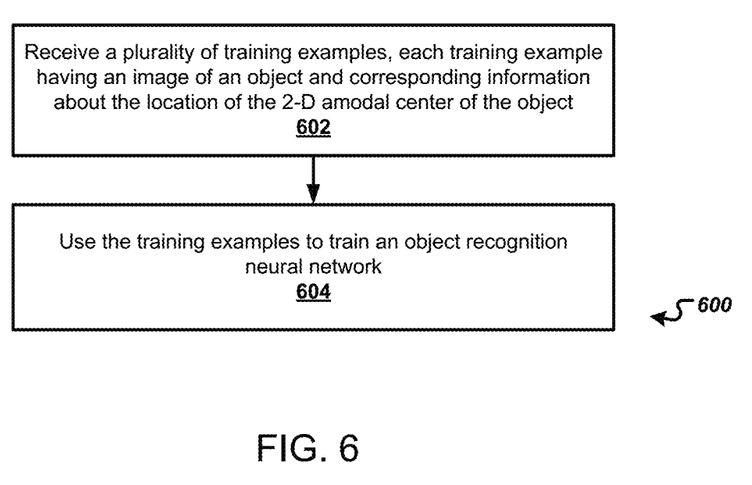
FIG. 6 is a flow chart of an example process for training an object recognition neural network.

FIG. 6 is a flow chart of an example process 600 for training an object recognition neural network 300. The process 600 will be described as being performed by an appropriately programmed neural network training system.

The neural network training system can implement the operations of each layer of the object recognition neural network that is designed to make 2-D amodal center predictions from an input image. The training system includes a plurality of computing devices having software or hardware modules that implement the respective operations of each layer of the neural network according to an architecture of the neural network. The training system can receive training examples that include labeled training data. The training system can iteratively generate updated model parameter values of the object recognition neural network. After training is complete, the training system can provide a final set of model parameter values to the AR system 200 for use in making object recognition predictions, e.g., predicting 2-D amodal centers. The final set of model parameter values can be stored in the cloud storage system 230 in the cloud computing environment 234 of the AR system 200.

The system receives a plurality of training examples, each training example having an image of an object and corresponding information about the location of the 2-D amodal center of the object (602). As discussed above, the image in each training example can be captured from a camera sensor of an AR device. The information about the location of the 2-D amodal center of the object is the ground truth label of the 2-D amodal center of the object. The location of the 2-D amodal center of the object, i.e., the ground truth label, can be pixel coordinates of the 2-D amodal center of the object. The location of the 2-D amodal center can be computed from a known 3-D bounding box of the object by projecting the 3-D object center, i.e., center of the 3-D bounding box, to the image under the camera pose of the image.

The system uses the training examples to train an object recognition neural network (604). The system can generate, for each object in the image in the training examples, a 2-D amodal center prediction using an object recognition neural network that is being trained. Each amodal center prediction represents the location of the predicted 2-D amodal center of the object in the image.

The system can compare the predicted 2-D amodal center to the ground truth label of the 2-D amodal center of the object in the training examples. The system can calculate a regression loss which can measure the differences between the predicted 2-D amodal center and the ground truth label in the training examples. For example, the regression loss can include a mean-square-error (MSE) loss that can measure the distance between the predicted 2-D amodal center and the ground truth label.

In some implementations, the object recognition output from a multi-task object recognition neural network, e.g., a multi-task RCNN, can further include one or more of the following: a predicted object category, a predicted 2-D bounding box, a predicted object instance mask, a predicted truncation score, etc. Each training example can further include ground truth labels of the object category, the 2-D bounding box, the object instance mask, the object truncation status (e.g., whether the object in the image is truncated or occluded), etc.

An object category classification loss can measure the differences between the predicted object category and the object category label. An object detection loss can measure location differences between the predicted 2-D bounding box and the ground truth label. An object segmentation loss can measure segmentation differences between the predicted object instance mask and the ground truth mask. A truncation classification loss can measure the differences between the predicted truncation score and the truncation label. A total loss can be a weighted sum of one or more of the following: the regression loss, the object category classification loss, the object detection loss, the object segmentation loss, the truncation classification loss, etc.

The system can then generate updated model parameter values of the object recognition neural network based on the regression loss, or the total loss in the case of a multi-task object recognition neural network, by using an appropriate updating technique, e.g., stochastic gradient descent with backpropagation. The system can then update the collection of model parameter values using the updated model parameter values.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

This specification uses the term "configured" in connection with systems and computer program components. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
   receiving an image of an object captured by a camera;
   processing the image of the object using an object recognition neural network that is configured to generate an object recognition output comprising:
      data defining a predicted two-dimensional amodal center of the object, wherein the predicted two-dimensional amodal center of the object is a projection of a predicted three-dimensional center of the object under a camera pose of the camera that captured the image;
   obtaining data specifying one or more other predicted two-dimensional amodal centers of the object in one or more other images captured under different camera poses; and
   determining, from (i) the predicted two-dimensional amodal center of the object in the image and (ii) the one or more other predicted two-dimensional amodal centers of the object, the predicted three-dimensional center of the object.

2. The method of claim 1, wherein the object recognition output comprises pixel coordinates of the predicted two-dimensional amodal center.

3. The method of claim 2, wherein the object recognition neural network comprises a regression output layer that generates the pixel coordinates of the predicted two-dimensional amodal center.

4. The method of claim 1, wherein the object recognition neural network is a multi-task neural network and the object recognition output also comprises data defining a bounding box for the object in the image.

5. The method of claim 4, wherein the predicted two-dimensional amodal center is outside of the bounding box in the image.

6. The method of claim 1, wherein the object recognition output comprises a truncation score that represents a likelihood that the object is truncated in the image.

7. A system comprising one or more computers and one or more storage devices storing instructions that when executed by the one or more computers cause the one or more computers to perform operations comprising:
   receiving an image of an object captured by a camera;
   processing the image of the object using an object recognition neural network that is configured to generate an object recognition output comprising:
      data defining a predicted two-dimensional amodal center of the object, wherein the predicted two-dimensional amodal center of the object is a projection of a predicted three-dimensional center of the object under a camera pose of the camera that captured the image;
   obtaining data specifying one or more other predicted two-dimensional amodal centers of the object in one or more other images captured under different camera poses; and
   determining, from (i) the predicted two-dimensional amodal center of the object in the image and (ii) the one or more other predicted two-dimensional amodal centers of the object, the predicted three-dimensional center of the object.

8. The system of claim 7, wherein the object recognition output comprises pixel coordinates of the predicted two-dimensional amodal center.

9. The system of claim 8, wherein the object recognition neural network comprises a regression output layer that generates the pixel coordinates of the predicted two-dimensional amodal center.

10. The system of claim 7, wherein the object recognition neural network is a multi-task neural network and the object recognition output also comprises data defining a bounding box for the object in the image.

11. The system of claim 10, wherein the predicted two-dimensional amodal center is outside of the bounding box in the image.

12. The system of claim 7, wherein the object recognition output comprises a truncation score that represents a likelihood that the object is truncated in the image.

13. One or more non-transitory computer-readable storage media storing instructions that when executed by one or more computers cause the one or more computers to perform operations comprising:
   receiving an image of an object captured by a camera;
   processing the image of the object using an object recognition neural network that is configured to generate an object recognition output comprising:
      data defining a predicted two-dimensional amodal center of the object, wherein the predicted two-dimensional amodal center of the object is a projection of a predicted three-dimensional center of the object under a camera pose of the camera that captured the image;
   obtaining data specifying one or more other predicted two-dimensional amodal centers of the object in one or more other images captured under different camera poses; and
   determining, from (i) the predicted two-dimensional amodal center of the object in the image and (ii) the one or more other predicted two-dimensional amodal centers of the object, the predicted three-dimensional center of the object.

14. The computer-readable storage media of claim 13, wherein the object recognition output comprises pixel coordinates of the predicted two-dimensional amodal center.

15. The computer-readable storage media of claim 14, wherein the object recognition neural network comprises a regression output layer that generates the pixel coordinates of the predicted two-dimensional amodal center.

16. The computer-readable storage media of claim 13, wherein the object recognition neural network is a multi-task neural network and the object recognition output also comprises data defining a bounding box for the object in the image.

17. The computer-readable storage media of claim 16, wherein the predicted two-dimensional amodal center is outside of the bounding box in the image.

18. The computer-readable storage media of claim 13, wherein the object recognition output comprises a truncation score that represents a likelihood that the object is truncated in the image.

* * * * *